United States Patent
Xiong et al.

(10) Patent No.: US 11,241,354 B2
(45) Date of Patent: Feb. 8, 2022

(54) GRAVITY BALANCING DEVICE FOR REHABILITATION ROBOT ARM

(71) Applicant: Huazhong University of Science and Technology, Hubei (CN)

(72) Inventors: Caihua Xiong, Hubei (CN); Jianbo Tao, Hubei (CN); Xuan Wu, Hubei (CN); Chang He, Hubei (CN); Wenbin Chen, Hubei (CN); Chenbo Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 481 days.

(21) Appl. No.: 16/156,605

(22) Filed: Oct. 10, 2018

(65) Prior Publication Data
US 2020/0000670 A1  Jan. 2, 2020

(30) Foreign Application Priority Data

Jun. 29, 2018 (CN) .......................... 201810712469.6

(51) Int. Cl.
*A61H 1/02* (2006.01)
*B25J 11/00* (2006.01)
(Continued)

(52) U.S. Cl.
CPC ......... *A61H 1/0281* (2013.01); *A61H 1/0277* (2013.01); *B25J 11/008* (2013.01);
(Continued)

(58) Field of Classification Search
CPC .......... A61H 1/00; A61H 1/0274–0288; A61H 2201/1659; A61H 2201/1215;
(Continued)

(56) References Cited

U.S. PATENT DOCUMENTS

| 5,170,777 A | * | 12/1992 | Reddy | .................. A61H 1/0274 482/44 |
| 2007/0225620 A1 | * | 9/2007 | Carignan | ............. A61H 1/0281 601/5 |

(Continued)

FOREIGN PATENT DOCUMENTS

| CN | 106363666 A | 2/2017 | | |
| WO | WO-2018093448 A2 | * | 5/2018 | ........... A61H 1/0285 |

*Primary Examiner* — Quang D Thanh
*Assistant Examiner* — Jacqueline M Pinderski
(74) *Attorney, Agent, or Firm* — Hamre, Schumann, Mueller & Larson, P.C.

(57) ABSTRACT

The present invention discloses a gravity balancing device for a rehabilitation robot arm, and belongs to the field of rehabilitation robots. The gravity balancing device includes a shoulder joint connecting member, an upper arm connecting member and a gravity balancing assembly; the shoulder joint connecting member and the upper arm connecting member are pivotally connected according to the human body bionic structure to simulate the rotational movement of the upper arm of the human body around the shoulder joint; the gravity balancing assembly includes a plurality of springs, wire ropes and guide pulleys, the wire ropes connect the springs to the shoulder joint connecting member and the upper arm connecting member, the spring tension is used to balance the gravity of the arm, and the guide pulleys are used to change the force directions of the wire ropes, thereby saving space and making the device structure more compact. Further, by locking different guide pulleys, the arm gravity can be still balanced by the spring tension after switching of the rehabilitation robot between the left and right hand training modes, thereby ensuring that the robot can still work normally after the training mode is switched.

6 Claims, 5 Drawing Sheets

(51) Int. Cl.
*B25J 17/02* (2006.01)
*F16H 19/06* (2006.01)

(52) U.S. Cl.
CPC .......... *B25J 17/0258* (2013.01); *F16H 19/06* (2013.01); *A61H 2201/1659* (2013.01); *F16H 2019/0695* (2013.01)

(58) Field of Classification Search
CPC .......... A61H 2205/06; A61H 2205/062; B25J 11/008; B25J 17/00; B25J 17/0258; B25J 19/0008; F16H 19/06; F16H 2019/0695
See application file for complete search history.

(56) References Cited

U.S. PATENT DOCUMENTS

| | | | | |
|---|---|---|---|---|
| 2008/0087871 | A1* | 4/2008 | Schena | F16H 19/06 254/226 |
| 2008/0288107 | A1* | 11/2008 | Tokita | B25J 9/104 700/245 |
| 2008/0304935 | A1* | 12/2008 | Scott | A61H 1/0262 414/5 |
| 2010/0249673 | A1* | 9/2010 | Nef | A61H 1/0281 601/33 |
| 2016/0206497 | A1* | 7/2016 | Deshpande | A61H 1/0281 |
| 2017/0348176 | A1* | 12/2017 | Herr | F16H 35/18 |

* cited by examiner

GRAVITY BALANCING DEVICE FOR REHABILITATION ROBOT ARM

BACKGROUND OF THE INVENTION

Technical Field

The present invention belongs to the field of rehabilitation robots, and more particularly relates to a gravity balancing device for a rehabilitation robot arm for balancing the joint torque generated by the gravity of the robot arm itself.

Description of the Related Art

With the advancement of science and technology, rehabilitation robots have been increasingly used in rehabilitation assisted training for patients with motor dysfunction. During the movement of the robot, the joint torque may be generated due to the gravity of the robot arm itself, which increases the motor load and affects the performance of the robot.

Chinese Patent Application Publication No. 106363666 discloses a device for balancing the gravity of a robot arm by using a cylinder, in which the angle information of the rotation of the robot upper arm is received by an encoder, a control component controls a proportional valve according to the angle information to adjust the pressure in the cylinder, and thus a connecting rod on the cylinder is pushed to balance the torque generated by the gravity. The device enables the robot upper arm to be not affected by the torque generated by the gravity when being rotated. However, due to the use of the motor, cylinder and the like, the device is large in volume and weight, and is not suitable for use on the rehabilitation robot.

In addition, for cost and other considerations, rehabilitation robots are gradually required to meet the left-right hand dual-purpose requirements. That is, when the robot arm is switched from the left hand training mode to the right hand training mode or from the right hand training mode to the left hand training mode, the device is still required to balance the gravity of the robot arm after the joint is rotated by an angle. However, existing devices are difficult to meet the requirement.

SUMMARY OF THE INVENTION

In view of the above-described problems or improvement requirements in the prior art, the present invention provides a gravity balancing device for a rehabilitation robot arm, in which by designing the arrangement of the springs, guide pulleys and wire ropes, counterweight balance after switching between the left hand training mode and the right hand training mode is achieved, thereby meeting use requirements of the left-right hand dual-purpose rehabilitation robot, so that the robot arm can still function normally after switching between the left hand training mode and the right hand training mode.

In order to achieve the above objective, the present invention provides a gravity balancing device for a rehabilitation robot arm, comprising: a shoulder joint connecting member, an upper arm connecting member and a gravity balancing assembly;

the shoulder joint connecting member and the upper arm connecting member are pivotally connected according to the human body bionic structure to simulate the rotational movement of the upper arm of the human body around the shoulder joint;

the gravity balancing assembly includes a first tension unit, a second tension and a locking mechanism;

the first tension unit includes a guide pulley A as well as a wire rope A, a spring A, a wire rope B, a guide pulley X, a wire rope C, a spring B, a wire rope D, a spring C and a wire rope E that are fixedly connected in sequence; the wire rope B and the wire rope C are respectively connected to two ends of the guide pulley X in the radial direction;

the second tension unit includes a guide pulley A' as well as a wire rope A', a spring A', a wire rope B', a guide pulley X', a wire rope C', a spring B', a wire rope D', a spring C' and a wire rope E' that are fixedly connected in sequence, the respective members of the second tension unit and the respective members of the first tension unit are arranged in one-to-one correspondence, have the same specification and are symmetrically distributed; the wire rope B' and the wire rope C' are respectively connected to two ends of the guide pulley X' in the radial direction;

head ends of the wire rope A and the wire rope A' are fixed on the shoulder joint connecting member; tail ends of the wire rope E and the wire rope E' are fixed on the upper arm connecting member and symmetrically distributed on two sides of the rotation axis of the upper arm connecting member; the guide pulley A and the guide pulley A' are fixed pulleys, and the wire rope D is connected to the spring B and the spring C after passing by the guide pulley A; the wire rope D' is connected to the spring B' and the spring C' after passing by the guide pulley A'; the guide pulleys A, A', X, X' are all disposed on the shoulder joint connecting member;

the locking mechanism is used to independently lock one of the guide pulley X and the guide pulley X' when the robot arm is switched between the right hand training mode and the left hand training mode.

Further, the first tension unit further includes a guide pulley B, and the second tension unit further includes a guide pulley B'; the guide pulley B and the guide pulley B' are both fixed on the upper arm connecting member, the tail end of the wire rope E and the tail end of the wire rope E' are fixedly connected to the guide pulley B and the guide pulley B', respectively.

Further, the guide pulley X includes a guide pulley C and a guide pulley D that are symmetrically and coaxially distributed on front and back sides of the shoulder joint connecting member to rotate synchronously; the wire rope A, the spring A and the wire rope B are located on the same side of the guide pulley D, and the wire rope C, the spring B, the wire rope D, the spring C and the wire rope E are located on the same side of the guide pulley C; the wire rope B is connected to the guide pulley D, and the wire rope C is connected to the guide pulley C;

the guide pulley X' includes a guide pulley C' and a guide pulley D' that are symmetrically and coaxially distributed on front and back sides of the shoulder joint connecting member to rotate synchronously; the wire rope A', the spring A' and the wire rope B' are located on the same side of the guide pulley C', and the wire rope C', the spring B', the wire rope D', the spring C' and the wire rope E' are located on the same side of the guide pulley D'; the wire rope B' is connected to the guide pulley C', and the wire rope C' is connected to the guide pulley D'.

Further, the first tension unit further includes a guide pulley E, a guide pulley F and a guide pulley G; the guide pulley F and the guide pulley G are located in the same plane and cooperate to clamp the wire rope E, the axis of the guide pulley E is perpendicular to the wire rope E and the axis of the guide pulley G; the wire rope E is connected to the upper arm connecting member after being guided by the guide pulley E, the guide pulley F and the guide pulley G;

the second tension unit further includes a guide pulley E', a guide pulley F' and a guide pulley G' that are arranged in one-to-one correspondence with the guide pulley E, the guide pulley F and the guide pulley G of the first tension unit in the same manner; the guide pulleys E, F, E', F' and G' are all fixed pulleys.

Further, the springs A and A' have the same stiffness, which is set to $K_1$, and the springs B, C, C' and B' have the same stiffness, which is set to $K_2$, $K_1$ is much smaller than $K_2$.

Further, sizes of the guide pulleys and the springs are constrained as follows:

$$\begin{cases} x_1 \geq \dfrac{\pi d}{2} \\ l_1 + x_1 \leq d_1 \\ 2x_2 \geq \dfrac{\pi d}{2} \\ 2x_2 + l_2 \leq d_2 \\ \dfrac{\pi d}{2} + l_2 \leq d_2 \end{cases}$$

where $l_1$ represents the original length of the springs with the stiffness $K_1$, $x_1$ represents the maximum elongation amount of the springs with the stiffness $K_1$, $l_2$ represents the original length of the springs with the stiffness $K_2$, $x_2$ represents the maximum elongation amount of the springs with the stiffness $K_2$, d represents the diameter of the shoulder joint, $d_1$ represents the distance between the head end of the wire rope A and the guide pulley D and the distance between the head end of the wire rope A' and the guide pulley C', $d_2$ represents the distance between the guide pulley C and the guide pulley A and the distance between the guide pulley A' and the guide pulley D'.

The gravity balancing device further includes a motor assembly A, a motor assembly B and a motor assembly C; the motor assembly B is mounted on a pivot joint of the shoulder joint connecting member and the upper arm connecting member to achieve shoulder joint flexion/extension freedom; the motor assembly A is mounted at an end of the shoulder joint connecting member to achieve shoulder joint abduction/adduction freedom; the motor assembly C is mounted at an end of the upper arm connecting member to achieve elbow joint internal rotation/external rotation freedom; rotation axes of the motor assembly A, the motor assembly B and the motor assembly C intersect at the same point.

Further, a wire rope groove is provided at a pivot end of the upper arm connecting member to limit the position of the wire rope E and the wire rope E during the rotation.

In general, by comparing the above technical solution of the present inventive concept with the prior art, the present invention has the following beneficial effects:

1) in the present invention, the gravity of the robot arm can be balanced, which reduces the motor load, and prolongs the service life of the motor. In addition, the device is suitable for use in the left-right hand dual-purpose rehabilitation robot.

2) in the present invention, the force directions of the wire ropes are changed by guide pulleys, so that the structure is compact and the gravity of the robot arm is balanced without increasing the size of the device.

3) in the present invention, the gravity of the robot arm is balanced through the spring tension, so that the weight of the robot is basically not increased compared to the method of using the balancing weights 4) in the present invention, the spring tension can be calculated by the joint rotation angle and the spring stiffness, which can reduce the difficulty of system control and greatly improve the stability and operability of the robot.

5) in the present invention, the gravity of the robot arm can be balanced only by the springs, wire ropes and guide pulleys, which can greatly reduce the cost of the robot compared with the methods of using the motor, cylinder and the like.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

Figure 1:
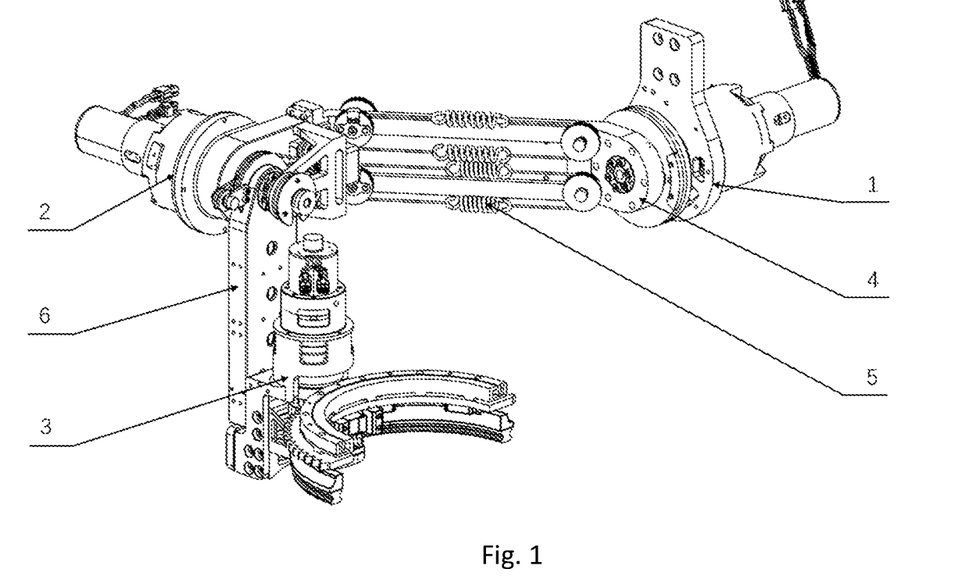
FIG. 1 is a schematic front view of the overall structure of the gravity balancing device according to the present invention.

As shown in FIG. 1, a gravity balancing device for a rehabilitation robot arm comprises a gravity balancing assembly, motor assemblies and connecting members.

Figure 3:
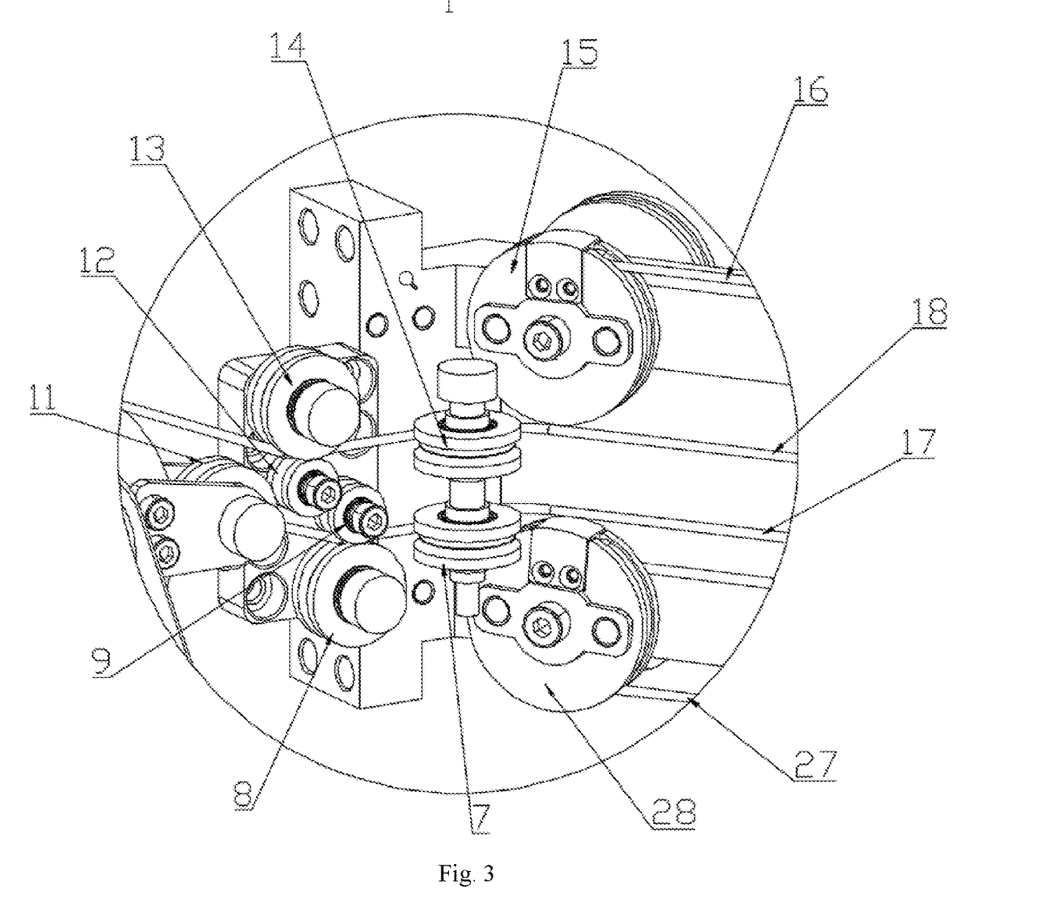
FIG. 3 is a partial enlarged view of the portion I in FIG. 2.
Figure 4:
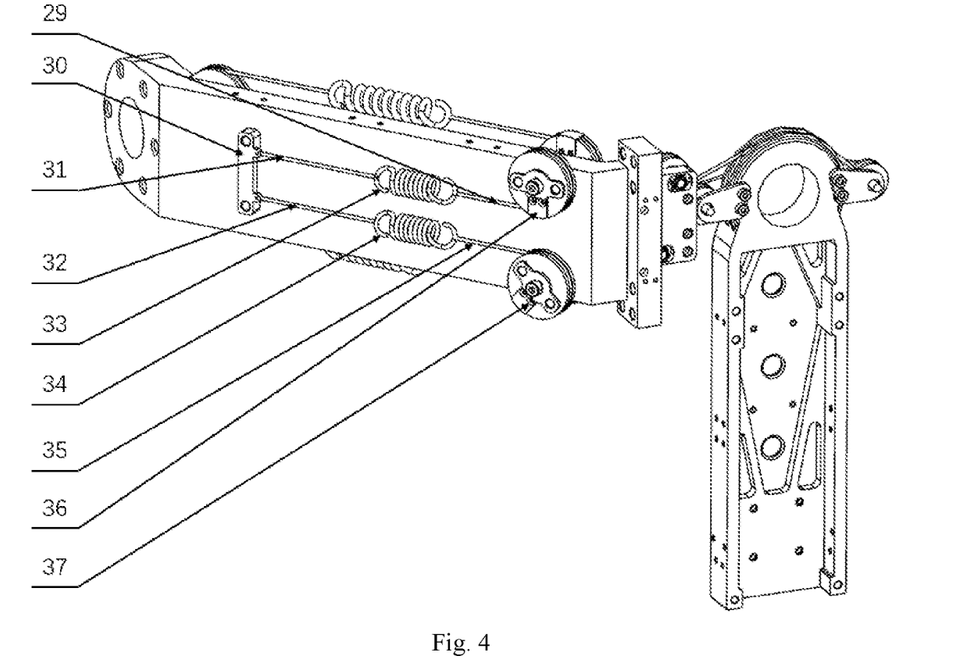
FIG. 4 is a schematic rear view of FIG. 2.
Figure 5:
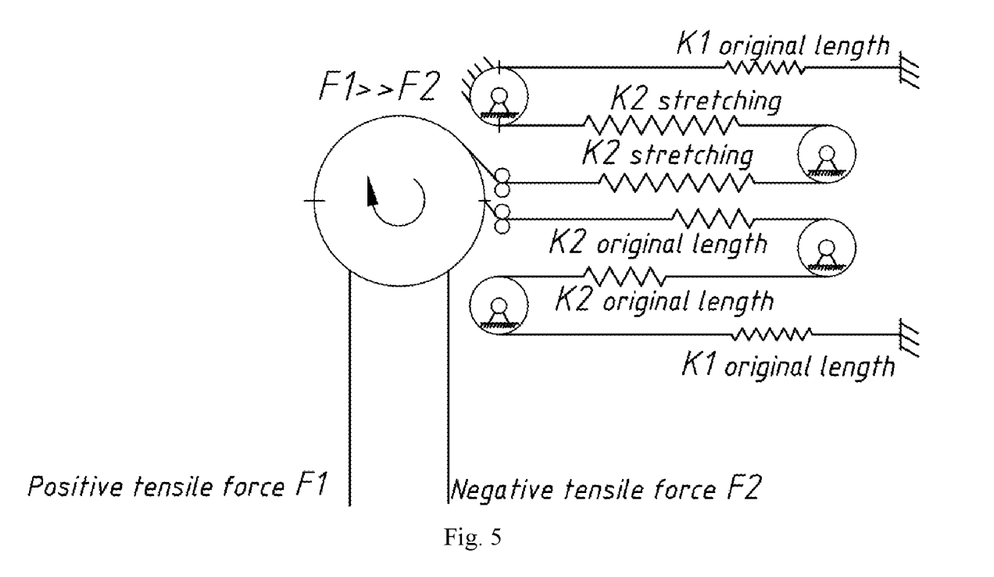
FIG. 5 is a schematic diagram showing the principle of the counterweight mechanism in the state of FIG. 2.

The motor assemblies includes a shoulder joint abduction/adduction freedom motor assembly A1, a shoulder joint flexion/extension freedom motor assembly B2 and an elbow joint internal rotation/external rotation freedom motor assembly C3; the connecting members includes a shoulder joint connecting member 4 and an upper arm connecting member 6; and the specific structure of the gravity balancing assembly is shown in FIGS. 4 and 5. As shown in FIG. 1 and FIG. 3, in order to switch the rehabilitation robot from the right hand training mode to the left hand training mode, the shoulder joint abduction/adduction freedom and the shoulder joint flexion/extension freedom are required to be rotated by 180°, and after the mode switching, the device of the present invention can continue to balance the gravity of the robot arm. The device of the present invention provides a counterweight force for the shoulder joint flexion/extension freedom, and thus only three degrees of freedom of the shoulder joint and its adjacent joint are listed, omitting other degrees of freedom of the rehabilitation robot.

Figure 2:
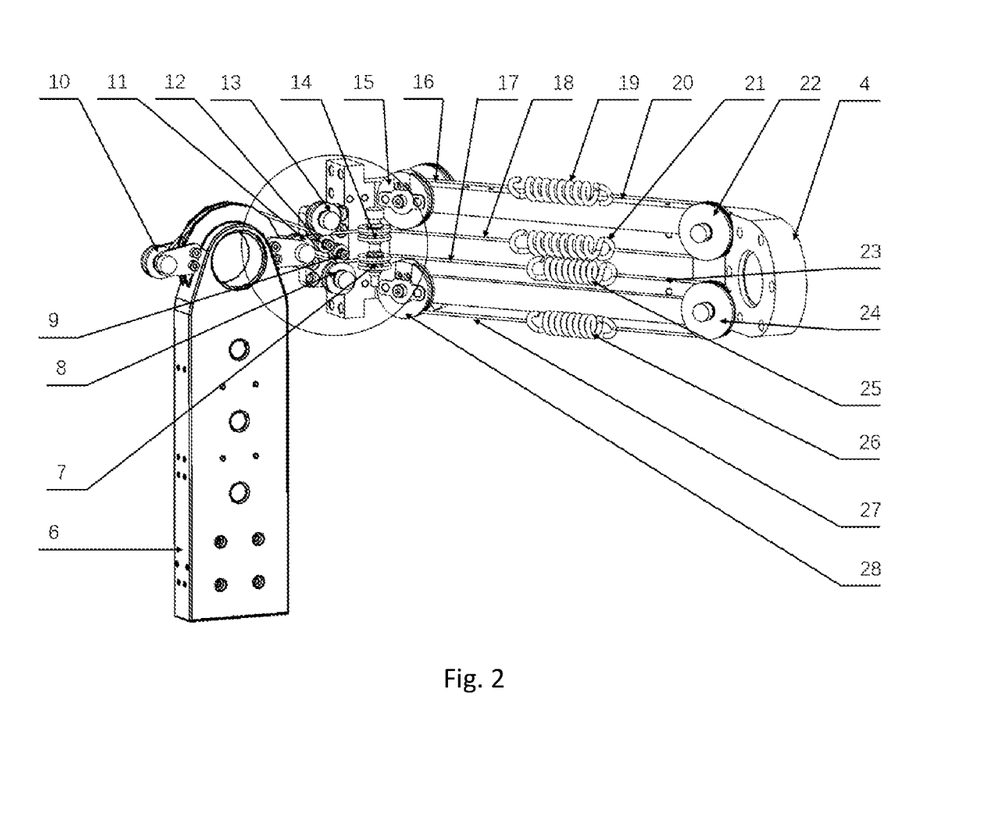
FIG. 2 is a schematic front view of the structure of the gravity balancing assembly in FIG. 1.

As shown in FIG. 2 to FIG. 4, the gravity balancing assembly 5 includes a guide pulley E'7, a guide pulley F'8, a guide pulley G'9, a guide pulley B10, a guide pulley B'11, a guide pulley G12, a guide pulley F13, a guide pulley E14, a guide pulley C15, a guide pulley A22, a guide pulley A'24, a guide pulley D'28, a guide pulley D36, a guide pulley C'37, a wire rope C16, a wire rope E'17, a wire rope E18, a wire rope D20, a wire rope D'23, a wire rope C'27, a wire rope B29, a wire rope A31, a wire rope A'32, a wire rope B'35, a spring B19, a spring C21, a spring C'25, a spring B'26, a spring A33, a spring A'34 and a wire rope fixing member 30.

Further, the springs A33 and A'34 have the same stiffness which is assumed to be $K_1$, and the springs B19, C21, C'25, B'26 have the same stiffness which is assumed to be $K_2$, $K_1$ being much smaller than $K_2$; the guide pulley C15 and the guide pulley D36 are fixed on the same shaft and can rotate synchronously. The guide pulley D'28 and the guide pulley C'37 are fixed on the same shaft and can rotate synchronously. The wire rope fixing member 30 is fixed on the shoulder joint connecting member 4, the wire rope A31 has one end fixedly connected to the wire rope fixing member 30 and the other end fixedly connected to the springs A33, the wire rope A'32 has one end fixedly connected to the wire rope fixing member 30 and the other end fixedly connected to the springs A'34, and the other ends of the springs A33 and A'34 are fixedly connected to the guide pulleys D36 and C'37 through the wire ropes B29 and B'35, respectively; the wire rope C16 has one end fixedly connected to the guide pulley C15 and the other end fixedly connected to the spring B19, the wire rope D20 has one end fixedly connected to the spring B19 and the other end fixedly connected to the spring C21 after passing by the guide pulley A22, the wire rope E18 has one end fixedly connected to the spring C21 and the other end fixedly connected to the guide pulley B10 after passing by the guide pulleys E14, F13 and G12 and a wire rope groove at the upper end of the upper arm connecting member 6; the wire rope C'27 has one end fixedly connected to the guide pulley D'28 and the other end fixedly connected to the spring B'26, the wire rope D'23 has one end fixedly connected to the spring B'26 and the other end fixedly connected to the spring C'25 after passing by the guide pulley A'24, and the wire rope E'17 has one end fixedly connected to the spring C'25 and the other end fixedly connected to the guide pulley B'11 after passing by the guide pulleys E'7, F'8 and G'9; the guide pulleys G'9 and G12 are respectively used to prevent the wire rope from coming out of rope grooves of the guide pulleys F'8 and F13.

In this embodiment, through forming holes in the guide pulley C15 and the shoulder joint connecting member 4, the guide pulleys C15 and D36 are locked by inserting the pin into the corresponding holes of the guide pulley C15 and the shoulder joint connecting member 4, and the guide pulleys C15 and D36 are unlocked by unplugging the pin. The guide pulleys D'28 and C'37 are locked in the same way. Of course, in other embodiments (not shown), locking or unlocking may also be performed by means of a brake, electronic control or the like.

As shown in FIGS. 2-4, in the initial position, the guide pulleys C15 and D36 are locked and cannot be rotated, and the guide pulleys D'28 and C'37 can be rotated freely; the springs C'25, 26, 33 and 34 are in an original length state, the springs B19 and 21 are in a stretched state, and the springs provide a positive moment of motion for the shoulder flexion/extension joint to balance a part of the gravity of the robot arm. When the shoulder flexion/extension joint is rotated by 90° in the forward direction to reach the limit of human motion, the springs B19 and C21 are shortened but still in a stretched state, and the springs C'25, B'26 and A'34 are elongated and in a stretched state. Since the stiffness $K_1$ of the spring A'34 is much smaller than the stiffness $K_2$ of the springs C'25 and B'26, the deformation is mainly concentrated on the spring A'34, and the lengths of the springs C'25 and B'26 are substantially unchanged. Therefore, it can be considered that the springs C'25 and B'26 are still in the original long state, and at this time, the springs still provide a positive moment.

Figure 6:
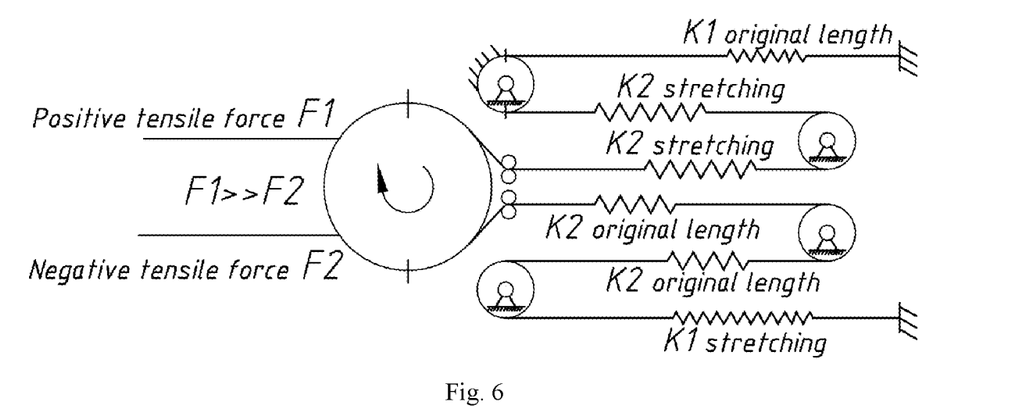
FIG. 6 is a schematic diagram showing the principle of the counterweight mechanism when the upper arm connecting member in FIG. 2 is lifted to a horizontal position.

Specifically, the working principle is shown in FIG. 5 and FIG. 6. Two pulleys fixed to ends of the wire ropes are symmetrically attached to the bracket of the upper arm. FIG. 5 shows the initial state of the counterweight mechanism in operating, and FIG. 6 shows the intermediate state of the counterweight mechanism in operating.

The counterweight mechanism provides the counterweight torque by the tension difference between the upper and lower wire ropes, thereby balancing the gravity of the robot arm. The upper and lower wire ropes of the counterweight mechanism have the same length, and springs connected in series to the wire ropes are the same, each including a small spring and two large springs. The small spring has a low stiffness, so that a large elongation amount can be generated by a small tensile force; and in contrast, the large spring has a large stiffness, so that only a small elongation amount can be generated by a large tensile force. When the counterweight mechanism operates, it is necessary to lock the rear guide pulley of the upper wire rope to prevent it from rotating, and to enable the rear guide pulley of the lower wire rope to rotate freely. When the upper wire rope is subjected to a tensile force, since the front guide pulley and the rear guide pulley are fixedly connected and cannot be rotated, the upper large springs are stretched, and the small spring remains the original length. When the lower wire rope is subjected to a tensile force, since the front and rear guide pulleys can be rotated and the small spring has a low stiffness, the lower large springs are hardly stretched, while the small spring is stretched significantly.

In the initial state shown in FIG. 5, since the upper wire rope is subjected to a tensile force, the two large springs $K_2$ are simultaneously elongated, and the positive tensile force acting on the shoulder flexion/extension joint is $$F_1 = \frac{K_2}{2} d_{max},$$

where $d_{max}$ represents the maximum elongation amount of the spring. Since the lower wire rope is not subjected to a tensile force, the negative tensile force acting on the shoulder flexion/extension joint is $F_2=0$. At this time, $F_1 \square F_2$. Therefore, the counterweight mechanism applies a positive moment to the joint to balance the gravity of the robot arm.

In the intermediate state shown in FIG. 6, similarly, the upper large springs $K_2$ are elongated, and the positive tensile force acting on the joint is $$F_1 = \frac{K_2}{2} d_2,$$

where $d_2$ represents the elongation amount of the spring. When the lower wire rope is subjected to a tensile force, since the stiffness difference between the large and small springs is too large, the large springs $K_2$ approximately maintain the original length, and the small spring $K_1$ is elongated, so that the negative tensile force acting on the shoulder flexion/extension joint is $F_2=K_1d_2$. Since $K_2 \square K_1$, $F_1 \square F_2$. Therefore, the counterweight mechanism still applies a positive moment to the joint to balance the gravity of the robot arm.

It can be seen from the above principle analysis that after switching of the robot arm between the right hand training mode and the left hand training mode, the locking state and rotating state of the rear guide pulleys are adjusted, and the operating mode of the counterweight mechanism is the same as that described above, and will not be described again.

Figure 7:
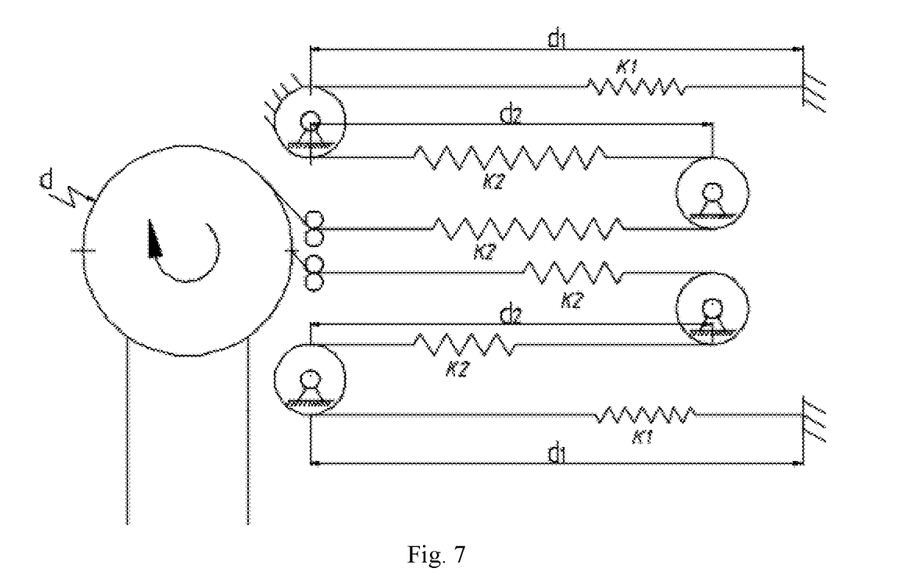
FIG. 7 is a schematic diagram showing the size relation in FIG. 5.
Figure 8:
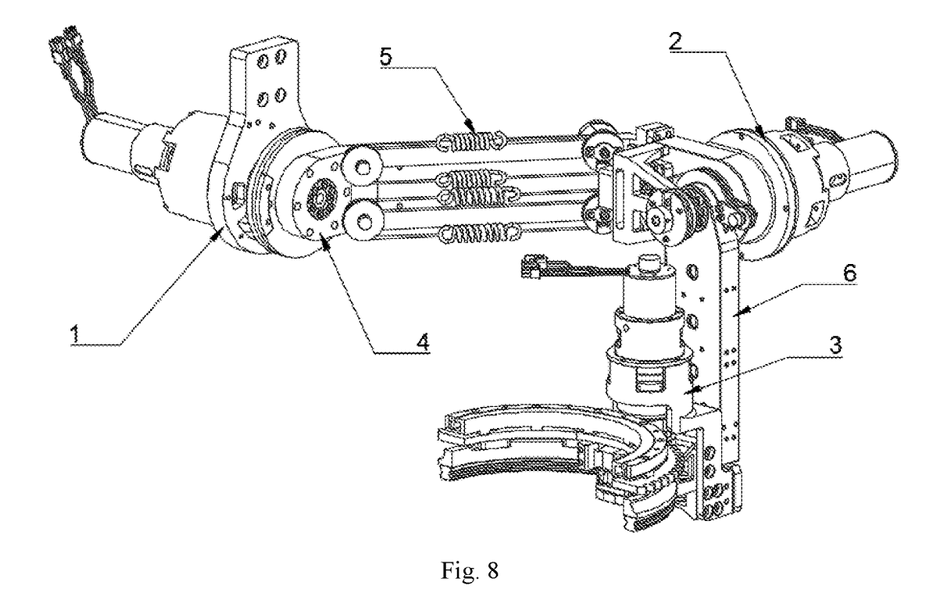
FIG. 8 is a schematic structural diagram of the rehabilitation robot after being switched from the right hand training mode to the left hand training mode.

In designing of the size, as shown in FIG. 7, there are constraints in the following formula (1):

$$\begin{cases} x_1 \geq \dfrac{\pi d}{2} \\ l_1 + x_1 \leq d_1 \\ 2x_2 \geq \dfrac{\pi d}{2} \\ 2x_2 + l_2 \leq d_2 \\ \dfrac{\pi d}{2} + l_2 \leq d_2 \end{cases} \quad (1)$$

where $l_1$ represents the original length of the small springs (i.e., the springs with the stiffness $K_1$, the same below), $x_1$ represents the maximum elongation amount of the small springs, $l_2$ represents the original length of the large springs (i.e., the springs with the stiffness $K_2$, the same below), $x_2$ represents the maximum elongation amount of the large springs, d represents the diameter of the shoulder joint, $d_1$ represents the distance from the rope fixing block to the rear guide pulley, $d_2$ represents the distance from the front fixed pulley to the guide pulley of the corresponding tension unit (i.e., the distance between the guide pulley C15 and the guide pulley A22, and the distance between the guide pulley A'24 and the guide pulley D'28).

Due to the limited space of the robot arm, the sizes are tentatively designed as follow: d=55 mm, $d_1$=154 and $d_2$=188 mm. In order to balance the gravity of the robot arm as much as possible, the following two springs were selected, whose parameters are as shown in Table 1 below.

TABLE 1

Parameters of counterweight springs for shoulder flexion/extension

| Type | Original length [mm] | Maximum elongation amount [mm] | Maximum tension [N] | Elastic coefficient [N/mm] |
|---|---|---|---|---|
| Large spring T32230 | 87.20 | 47.60 | 141 | 2.52 |
| Small spring E0180-014-1250-M | 31.75 | 95.00 | 3.42 | 0.035 |

Through substituting the size parameters of the large and small springs into the formula (1), it can be easily calculated that the results meet the requirements.

According to the parameters shown in Table 1, the maximum joint torque provided by the spring set can be calculated according to the formula (2).

$$T = F\dfrac{d}{2} \quad (2)$$

Thus, the maximum joint torque provided by the counterweight mechanism is $$T = 141 \times \dfrac{55}{2 \times 1000} = 3.88 \; Nm.$$

As shown in FIGS. 2-4 and FIG. 8, when the rehabilitation robot is switched from the right-hand training mode to the left-hand training mode, the shoulder flexion/extension joint is rotated by 180° in the forward direction. At this time, the guide pulleys D'28 and C'37 are locked, and the guide pulleys C15 and D36 are released, which is equivalent to returning to the initial position. Thus, balancing of the gravity of the robot arm can be continued.

In general, the gravity balancing device of the present invention is suitable for use in a left-right hand dual-purpose rehabilitation robot, in which a part of the gravity of the robot arm is balanced by springs, thereby reducing the motor load and improving the service life of the robot arm; the arrangement of the springs and the guide pulleys does not substantially increase the volume and weight of the robot itself; the counterweight force provided by the springs can be calculated according to the spring stiffness and the joint rotation angle, thereby effectively improving the stability and operability of the robot and improving the overall performance of the rehabilitation robot.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. A gravity balancing device for a rehabilitation robot arm, comprising: a shoulder joint connecting member, an upper arm connecting member and a gravity balancing assembly;

the shoulder joint connecting member and the upper arm connecting member are pivotally connected according to a human body bionic structure to simulate rotational movement of the upper arm of a human body around the shoulder joint;

the gravity balancing assembly includes a first tension unit, a second tension unit and a locking mechanism;

the first tension unit includes a first guide pulley as well as a first wire rope, a first spring, a second wire rope, a second guide pulley, a third wire rope, a second spring, a fourth wire rope, a third spring and a fifth wire rope that are fixedly connected in sequence; the second wire rope and the third wire rope are respectively connected to two ends of the second guide pulley in a radial direction;

the second tension unit includes a third guide pulley as well as a sixth wire rope, a fourth spring, a seventh wire rope, a fourth guide pulley, an eighth wire rope, a fifth spring, a ninth wire rope, a sixth spring and a tenth wire rope that are fixedly connected in sequence, the respective members of the second tension unit and the respective members of the first tension unit are arranged in one-to-one correspondence, have a same specification and are symmetrically distributed; the seventh wire rope and the eighth wire rope are respectively connected to two ends of the fourth guide pulley in the radial direction;

head ends of the first wire rope and the sixth wire rope are fixed on the shoulder joint connecting member; tail ends of the fifth wire rope and the tenth wire rope are fixed on the upper arm connecting member and are symmetrically mirroring each other from either side of a rotation axis of the upper arm connecting member; the first guide pulley and the third guide pulley are fixed pulleys, and the fourth wire rope is connected to the second spring and the third spring after passing by the first guide pulley; the ninth wire rope is connected to the fifth spring and the sixth spring after passing by the third guide pulley; the first, second, third, and fourth guide pulleys are all disposed on the shoulder joint connecting member;

the locking mechanism is used to independently lock one of the second guide pulley and the fourth guide pulley when the robot arm is switched between a right hand training mode and a left hand training mode, and wherein the first and fourth springs have a same stiffness, which is set to K1, and the second, third, fifth, and sixth springs have a same stiffness, which is set to K2, K1 is smaller than K2.

2. The gravity balancing device for the rehabilitation robot arm of claim 1, wherein the first tension unit further includes a fifth guide pulley, and the second tension unit further includes a sixth guide pulley; the fifth guide pulley and the sixth guide pulley are both fixed on the upper arm connecting member, the tail end of the fifth wire rope and the tail end of the tenth wire rope are fixedly connected to the fifth guide pulley and the sixth guide pulley, respectively.

3. The gravity balancing device for the rehabilitation robot arm of claim 1, wherein the second guide pulley includes a seventh guide pulley and an eighth guide pulley that are symmetrically and coaxially distributed on front and back sides of the shoulder joint connecting member to rotate synchronously; the first wire rope, the first spring and the second wire rope are located on a same side of the eighth guide pulley, and the third wire rope, the second spring, the fourth wire rope, the third spring and the fifth wire rope are located on a same side of the seventh guide pulley; the second wire rope is connected to the eighth guide pulley, and the third wire rope is connected to the seventh guide pulley;

the fourth guide pulley includes a ninth guide pulley and a tenth guide pulley that are symmetrically and coaxially distributed on front and back sides of the shoulder joint connecting member to rotate synchronously; the sixth wire rope, the fourth spring and the seventh wire rope are located on a same side of the ninth guide pulley, and the eighth wire rope, the fifth spring, the ninth wire rope, the sixth spring and the tenth wire rope are located on a same side of the tenth guide pulley; the seventh wire rope is connected to the sixth guide pulley, and the sixth wire rope is connected to the ninth guide pulley.

4. The gravity balancing device for the rehabilitation robot arm of claim 1, wherein the first tension unit further includes an eleventh guide pulley, a twelfth guide pulley and a thirteenth guide pulley; the twelfth guide pulley and the thirteenth guide pulley are located in a same plane and cooperate to clamp the fifth wire rope, an axis of the eleventh guide pulley is perpendicular to the fifth wire rope and an axis of the thirteenth guide pulley; the fifth wire rope is connected to the upper arm connecting member after being guided by the eleventh guide pulley, the twelfth guide pulley and the thirteenth guide pulley;

the second tension unit further includes a fourteenth guide pulley, a fifteenth guide pulley and a sixteenth guide pulley that are arranged in one-to-one correspondence with the eleventh guide pulley, the twelfth guide pulley and the thirteenth guide pulley of the first tension unit in a same manner; the eleventh, twelfth, thirteenth, fourteenth, fifteenth, and sixteenth guide pulleys are all fixed pulleys.

5. The gravity balancing device for the rehabilitation robot arm of claim 1, wherein sizes of the guide pulleys and the springs are constrained to be:

$$\begin{cases} x_1 \geq \dfrac{\pi d}{2} \\ l_1 + x_1 \leq d_1 \\ 2x_2 \geq \dfrac{\pi d}{2} \\ 2x_2 + l_2 \leq d_2 \\ \dfrac{\pi d}{2} + l_2 \leq d_2 \end{cases}$$

where $l_1$ represents an original length of the springs with the stiffness $K_1$, $x_1$ represents a maximum elongation amount of the springs with the stiffness $K_1$, $l_2$ represents an original length of the springs with the stiffness $K_2$, $X_2$ represents a maximum elongation amount of the springs with the stiffness $K_2$, d represents a diameter of the shoulder joint, $d_1$ represents a distance between the head end of the first wire rope and the eighth guide pulley and a distance between the head end of the sixth wire rope and the ninth guide pulley, $d_2$ represents a distance between the seventh guide pulley and the first guide pulley and a distance between the third guide pulley and the tenth guide pulley.

6. The gravity balancing device for the rehabilitation robot arm of claim 1, further comprising a first motor assembly, a second motor assembly and a third motor assembly; the second motor assembly is mounted on a pivot joint of the shoulder joint connecting member and the upper arm connecting member to achieve shoulder joint flexion/extension freedom; the first motor assembly is mounted at an end of the shoulder joint connecting member to achieve shoulder joint abduction/adduction freedom; the third motor assembly is mounted at an end of the upper arm connecting member to achieve elbow joint internal rotation/external rotation freedom; rotation axes of the first motor assembly, the second motor assembly and the third motor assembly intersect at a same point.

* * * * *